March 20, 1962 YASUSHI HOSHINO ET AL 3,026,381

MECHANISM FOR ENABLING A MAGNETIC RECORDER TO BE USED WITH A MAGNETIC RECORD SHEET SHORTER THAN STANDARD SIZE

Filed June 2, 1959 2 Sheets-Sheet 1

MECHANISM FOR ENABLING A MAGNETIC RECORDER TO BE USED WITH A MAGNETIC RECORD SHEET SHORTER THAN STANDARD SIZE

Filed June 2, 1959

2 Sheets-Sheet 2

INVENTOR.

BY

United States Patent Office 3,026,381

Patented Mar. 20, 1962

3,026,381

MECHANISM FOR ENABLING A MAGNETIC RECORDER TO BE USED WITH A MAGNETIC RECORD SHEET SHORTER THAN STANDARD SIZE

Yasushi Hoshino, 462 1-chome, Tamagawa, Okusawa-cho, Setagaya-ku, and Minoru Sato, 635 Ishikawacho, Apt. No. 168, Ishikawa-cho, Ota-ku, both of Tokyo, Japan Filed June 2, 1959, Ser. No. 817,558
Claims priority, application Japan June 3, 1958
2 Claims. (Cl. 179—100.2)

This invention relates to improvements of magnetic sound transducing machines to adapt the same for record sheets shorter than a standard size.

The magnetic record sheet dealt with by this invention is a sheet which is used on a machine as described in copending application, Ser. No. 635,335, filed January 22, 1957, and the sheet itself is explained in copending application, Ser. No. 635,504, filed on January 22, 1957. When the size of magnetic record sheets is standard, there is no difficulty in sound recording and reproducing by the machine described above. However, it is desired sometimes to use a magnetic sound record sheet which is smaller than a standard size for economy or some other reasons. For example, when the content of the sheet is simple and short, it is wasteful to use the whole page of a sheet of a standard size which is generally as big as a sheet of letter writing paper. However, when a sheet shorter than the standard size is used, there arise various difficulties as explained hereinafter in the use thereof.

An object of this invention is to provide a device which eliminates difficulties occurring in the use of a magnetic sound record sheet of a size shorter than a standard size.

The features and the merits of the present invention will be understood clearly from the following explanations reference being made to the accompanying drawings wherein.

Before entering the explanation of the present invention, a brief description will be made of the magnetic sound record sheet and the magnetic sound record reading machine of said copending applications.

Figures 1, 2, 3, 4, 12, 13, 15:
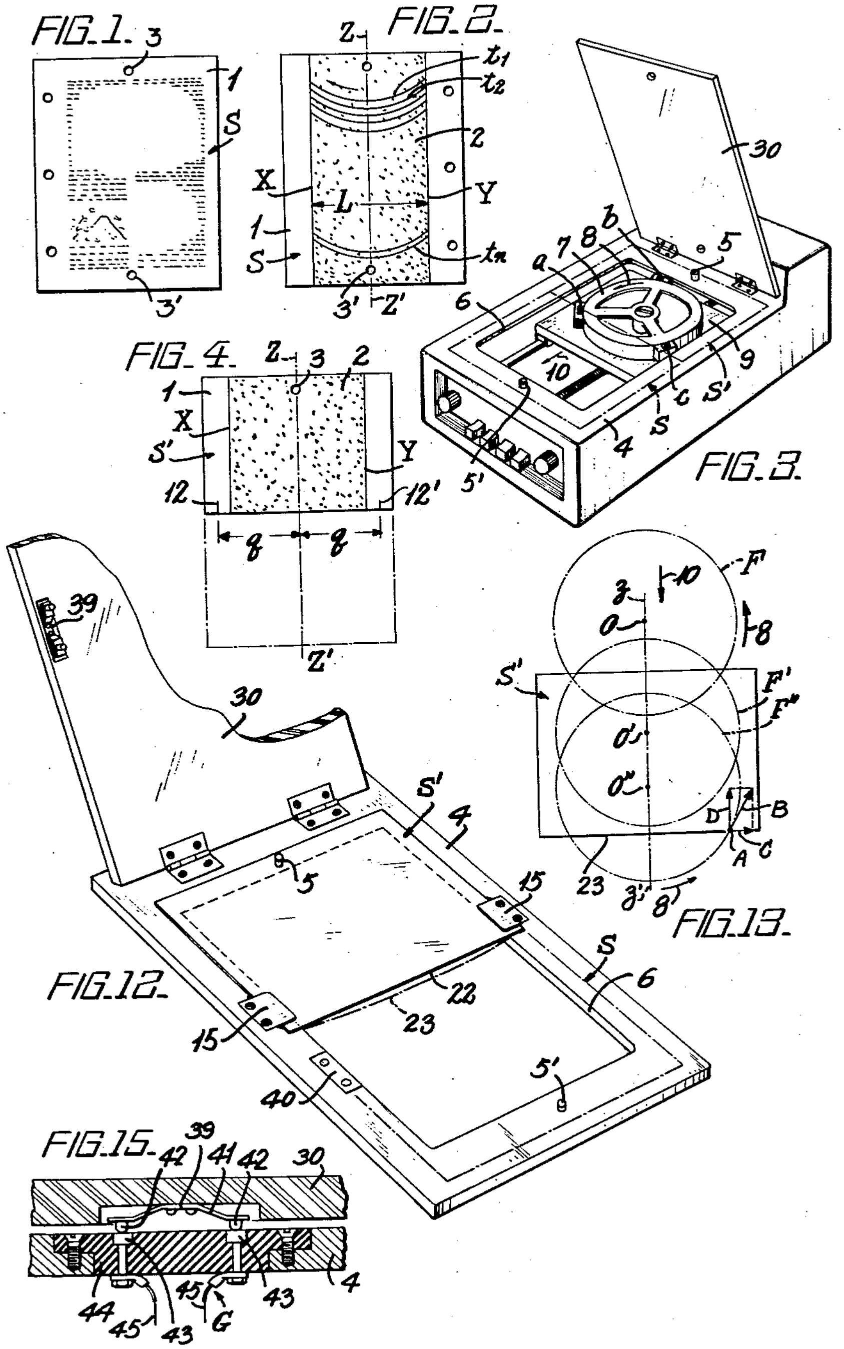
FIG. 1 is a plan view of the front surface of magnetic sound record sheet of standard size.
FIG. 2 is a plan view of the back surface of the same sheet.
FIG. 3 is a perspective view of a magnetic sound transducing machine.
FIG. 4 is a plan view of a magnetic sound record sheet the length of which is shorter than standard size.
FIG. 12 is a perspective view showing a panel plate and a pressing plate provided with a switch forming a part of a device for stopping the motion of the turntable at a proper time, when a shorter magnetic sound record sheet is used on a magnetic sound record reading machine.
FIG. 13 is a diagrammatic view illustrating the relation between a turntable and a shorter magnetic sound record sheet.
FIG. 15 is a sectional view of a switch consisting of a contacting member provided on a pressing plate and a contacting member provided on a panel plate.

The magnetic sound record sheet S (FIG. 1) has a base carrier 1 of a material such as paper or plastic and has a size like a sheet of paper commonly used for letter writing. The front surface has thereon a description comprising letters, pictures, photographs and/or any other desired visible marks as shown diagrammatically in FIG. 1 and the back surface has a magnetic sound record film 2 coated thereon as shown in FIG. 2. This magnetic coating film is delimited by two parallel lines X and Y and on this magnetic coating film, sound tracks $t_1, t_2 \ldots t_n$ of arcuate shape are formed and reproduced by a magnetic sound transducing machine as explained in the following.

The magnetic sound transducing machine (hereinafter called "reading machine") has a panel plate 4 (see FIG. 3) on which the magnetic sound record sheet of FIGS. 1 and 2 (hereinafter called "record sheet") is placed, the back surface provided with a magnetic coating film 3 facing downwardly. The panel plate has a large window 6 and hence when the record sheet is placed thereon, the magnetic coating film is exposed downwardly. Below the panel plate 4 is located a turntable 7. This turntable is rotatable around its axis, for example, in the direction of arrow 8 and at the same time, is shiftable in a longitudinal direction indicated by arrow 10, said turntable being integrally connected with a shiftable table which is moved longitudinally. The turntable 7 has a plurality of sound recording and reproducing heads *a*, *b*, *c* spaced from one another by a distance equal to the width L of the magnetic coating film 2 of the record sheet. The reading machine has further a transparent pressing plate 30 which is adapted to be placed on the record sheet set on the panel plate 4.

When the record sheet is placed on the panel plate 4 and pressed from the top by the transparent pressing plate 30, the turntable 7 is operated to rotate and shift. In this operation, the sound recording and reproducing heads *a*, *b*, *c* are brought into contact with the magnetic coating film 2 in turn to record sound tracks $t_1, t_2 \ldots t_n$ or to scan recorded tracks to reproduce sound. Since the pressing plate is transparent and the record sheet is kept at a standstill, one can read the descriptions on the front surface easily while hearing the sound reproduced. The sound recorded is related to the descriptions on the front surface and hence one can understand or enjoy better the content of the record sheet due to the simultaneous seeing and hearing which is possible. This is the fundamental principle of the machine.

It is evident that the record sheet must be always placed in a correct position on the reading machine in the above operation, otherwise satisfactory recording and reproducing can not be attained. For this purpose, on the panel plate are provided setting pins 5 and 5' and on the record sheet are provided setting holes 3 and 3'. When the sheet is set on the panel plate by engaging setting holes 3 and 3' with the setting pins 5 and 5', the sheet takes a correct position.

As long as the record sheet is of standard size, the distance between the setting holes 3 and 3' is equal to the distance between the setting pins 5 and 5', and therefore the setting of the record sheet on the panel plate can be carried out very easily.

However, when the content of the record sheet is simple and short, it is uneconomical to use a sheet of standard size, and it is desirable to use a record sheet of a smaller size. However, when a sheet of a smaller size is used, there will be difficulties in setting the sheet in the correct position on the reading machine.

FIG. 4 illustrates a record sheet which is shorter than the standard size. On such a sheet, one of the setting holes 3 may be provided but it is impossible to provide another setting hole 3' which corresponds to the setting pin 5' on the panel plate 4.

Figures 5, 6, 7, 8, 9, 10, 11, 14, 16:
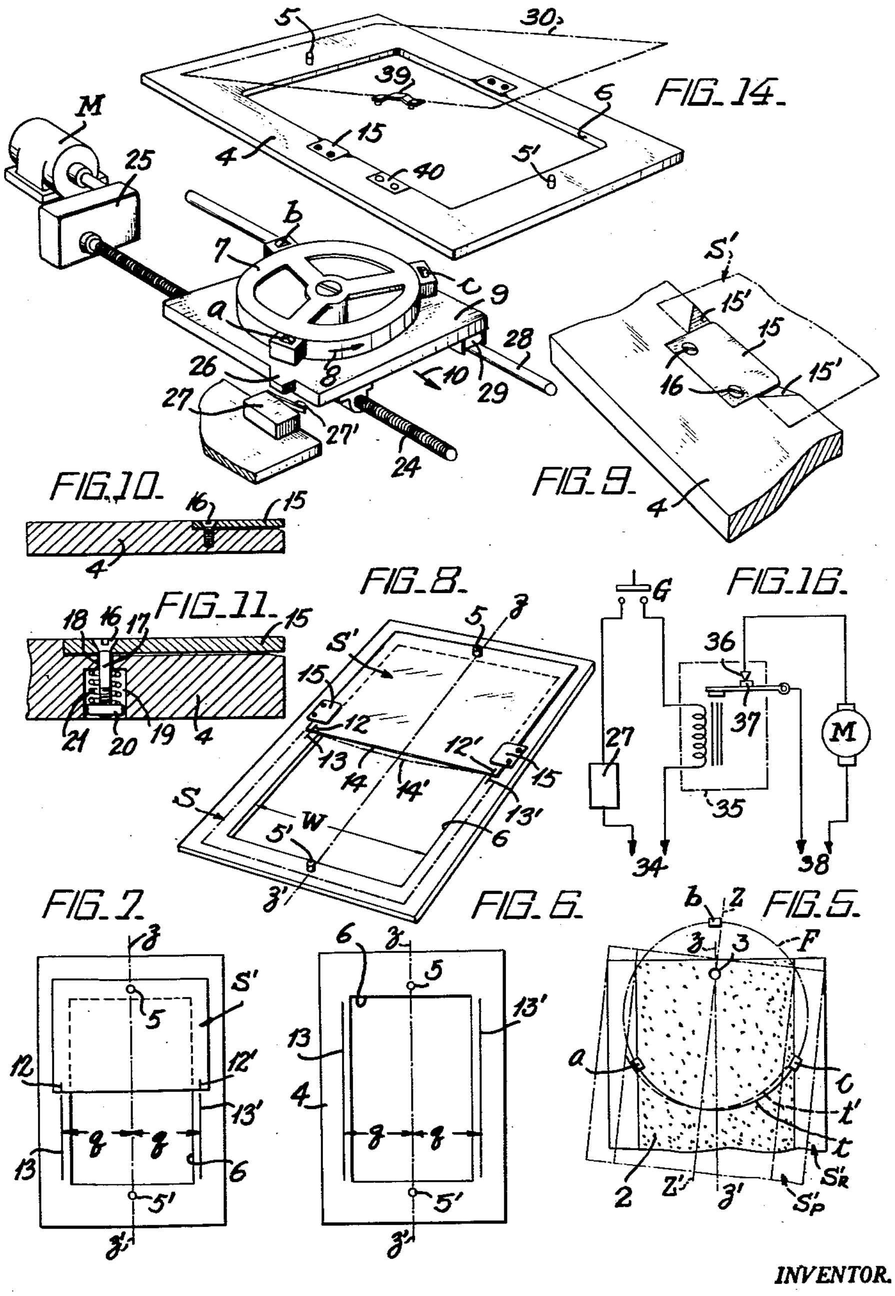
FIG. 5 is a view illustrating the relation between a turntable and a magnetic sound record sheet placed in an incorrect position.
FIG. 6 is a plan view of a panel plate having indicator lines for placing a shorter magnetic sound record sheet in a correct position.
FIG. 7 is a plan view of a shorter magnetic sound record sheet in correct position on the panel plate of FIG. 6.
FIG. 8 is a perspective view of a panel plate holding a shorter magnetic sound record sheet in correct position by means of a holding device according to the present invention.
FIG. 9 is a perspective view of the holding device of FIG. 8 illustrated on enlarged scale, unessential parts being removed for faciliating explanation.
FIG. 10 is a sectional view of the holding device of FIG. 9.
FIG. 11 is a sectional view of a modified holding device.
FIG. 14 is a perspective view of the means for shifting a turntable and a device which operates to stop the motion of the turntable when it reaches a predetermined position, the panel plate and the pressing plate provided with a switch forming a part of such a device being shown apart from the mechanism for driving the turntable in order to make the drawing clearer.
FIG. 16 is a diagram of an electric system of the device according to the present invention.

When such a sheet is set on the panel plate 4 by engaging the setting hole 3 with the setting pin 5, the sheet may swing about the setting 5 as shown in FIG. 5. Assuming that the sheet took the position shown by full lines when sound was recorded, and takes the position shown by dot-chain lines when sound is produced, it is apparent that the locus of the head does not coincide with the sound track of the sheet at the time of reproduction, since the head on the turntable scans the track as shown by full lines *t* while the sound track *t'* takes the position as shown by broken lines. The left end portion of the sound track *t'* is missed during reproduction and the head scans a part where no sound track exists when it is in the right end portion of the locus *t*. Further, even when the head is scanning the part where the sound track exists, the locus of the head does not coincide with the sound track of the record sheet as shown in FIG. 5, and hence the reproduction of sound will not be satisfactory.

One of the objects of the present invention is to provide means which makes it possible to set a record sheet in correct position on the panel plate of a reading machine even if the record sheet is shorter than standard length. For this purpose, as shown in FIG. 4, the record sheet is provided with marks 12 and 12' on opposite sides of the center line Z—Z' at equal distances *q* and, at the same time, the panel plate 4 is provided with mark lines 13 and 13' on opposite sides of the center line *z—z'* at equal distance *q* as shown in FIG. 6.

When the record sheet is placed on the panel plate 4 by engaging the setting hole 3 of the sheet with the seting pin 5 of the panel plate and registering the marks 12 and 12' of the sheet with the mark lines 13 and 13' of the panel plate 4 as shown in FIG. 7, the sheet will take its correct position and the center line Z—Z' of the sheet and the center line *z—z'* of the panel plate 4 will coincide with each other. After placing the record sheet in correct position by the operation described above, the pressing plate 30 is lowered on the sheet to maintain it in correct position during sound recording and reproducing operation. By the means described above, the record sheet is always set in correct position both in recording and reproducing, and therefore satisfactory sound recording and reproducing can be attained.

While the marks on the sheet illustrated in FIG. 4 are lines, said marks may be points, notches or any other marks which are convenient to provide and which facilitate registration with the marks on the panel plate 4. The marks on the panel plate are similarly not limited to lines but may be any other convenient marks.

By the means described above, the position of the record sheet may be decided easily, but there will still be some difficulties in maintaining said sheet in the adjusted position since the sheet is freely movable before it is pressed by the pressing plate.

For example, when the pressing plate 30 is lowered, the sheet may be moved by wind caused by the motion of the pressing plate 30. Further, the sheet of a shorter length has no support at its bottom end and therefore it has the tendency to sag in the middle portion as shown by a dot-chain line 14' in FIG. 8. If it sags as shown in the drawing, when a head on the turntable comes into contact with the sheet and scans the sheet, the sheet may be wrinkled and there may occur discrepancy between the sound track on the sheet and the locus of the head. Under such conditions, it is hard to attain satisfactory sound recording and reproducing.

In order to avoid such difficulties, it is desirable to provide means for securing the sheet firmly in correct position and in stretched condition.

Another object of the present invention is to provide means for securing a record sheet smaller than a standard size firmly in correct position and in stretched condition. For this purpose, holding plates 15 are provided on opposite sides of the panel plate 4 as shown in FIG. 8 near the end of a record sheet of a size smaller than the standard size. Each holding plate 15 is elastic and fixed in a recess provided on the edge of the panel plate 4 by means of screws 16 as shown in FIGS. 9 and 10. When the edges of the record sheet S' are inserted below the elastic plates 15 on opposite sides of the panel plate 4, the sheet is firmly held and is maintained in correct position and stretched condition. Recesses 15' are notches provided on the panel plate 4 besides each holding plate 15. The provision of such notches will facilitate the insertion of the edge of the record sheet S' below the holding plate 15.

FIG. 11 illustrates a modified form of the holding device. The general construction is similar to that of FIG. 10. The screw 16, however, is not threaded into the panel plate 4 but the stem 17 of the screw is passed through a hole 18 provided in the panel plate 4 to reach a hole 19 of a larger diameter. At the end of the screw stem 17, a lock nut 20 is fixed and a spiral coil 21 is set around the screw stem 17 between the lock nut 20 and the top of the hole 19 as shown in the drawing. Since the holding plate 15 is fixed elastically by the screw 16 which is under the control of the helical spring 21, it will be easy to insert the edge of the record sheet S' by raising the holding plate 15. Furthermore, the pressing force applied on the sheet by the holding plate 15 may be easily adjusted by turning the lock nut 20 on the screw stem 17, and therefore this embodiment is very convenient in use.

While only one holding plate 15 is illustrated on each side of the panel plate in FIG. 8, if it is desired two or more pairs of holding plates as shown in FIGS. 9 and 10, or FIG. 11 may be provided for holding sheets of different length.

When a record sheet of a shorter length than standard size is used on a reading machine, there may still occur some difficulty even if the holding plates described above are provided.

As explained above, in the operation, a record sheet is placed on a panel plate 4 of a reading machine, and a turntable 7 having sound recording or reproducing heads is simultaneously rotated and shifted in longitudinal direction below the panel plate and the heads on the turntable scan the surface of the magnetic coating film of the record sheet by turns.

Now, assume that a record sheet S' having a shorter length than the standard size is placed on a panel plate 4 having a window 6. The record sheet S' is supported on the edge of the panel plate and held by the setting pin 5 and the holding plates 15, 15 in its position. If the record sheet S' is stretched properly and held in the stretched condition by the holding plates, the lower edge of the sheet will be straight as shown in full lines 22 in FIG. 12, but since there is no support along the edge, the lower edge is apt to sag down as shown by dot-chain line 23 unless much care is exercised in setting the record sheet S′ on the panel plate 4. Assume that the lower edge of the sheet is in the condition as shown by the dot-chain line 23 in FIG. 12.

In FIG. 13, O represents the center of the turntable at the time of start and F the locus of a head on the turntable at that time.

The turntable is rotated in the direction of arrow 8 and moves linearly in the direction of arrow 10. When the center O of the turntable reaches O′, the locus of the head is F′ and there will be no difficulty in operation, but when the center of the head reaches O″, the locus of the head will be F″. When the head has a locus as F″, the head must enter on the surface of the sheet from outside of the sheet at point A. When the bottom edge of the sheet sags as shown by line 23 in FIG. 12, the head catches the edge instead of going over it smoothly.

The direction of the motion of the head is A—B and may be broken down into a component along the direction of the edge A—C and a component A—D perpendicular to it. The latter motion acts to turn up the sheet S′ and is likely to cause serious damage to the sheet and the head.

One of the objects of the present invention is to prevent entirely such a risk of causing damage to the sheet and the head.

According to the present invention, the motion of the turntable is automatically stopped before its center reaches a point such as O″ which may cause damage to the sheet and the head, and therefore a record sheet of a shorter length than a standard size can be safely operated with no anxiety.

For good understanding of this aspect of the present invention, a short explanation will be made as to how the turntable of the reading machine is moved in longitudinal direction.

In FIG. 14, the turntable is rotatably mounted on a shiftable table 9. The housing of the reading machine has a helical screw 24 which is rotated by a motor M through a reduction gear 25. The shiftable plate 9 is slidably mounted on a guide rail 28 by means of rollers 29 and is driven in longitudinal direction by the rotation of the helical screw 24. According to the present invention, a projection 26 is provided on the shiftable table 9, and a switch 27 having a lever 27′ is provided in the housing of the reading machine in a fixed position determined by the length of the record sheet having a smaller length than standard size. When the shiftable plate 9 proceeds, the projection 26 comes into contact with the lever 27′ of the switch 27 to close the circuit of said switch.

FIG. 16 illustrates an electric system which controls the operation of the motor M driving the helical screw 24.

In the drawing, 34 is an electric source and there are the switch 27 as described above and another switch G. When both switches 27 and G are closed, a relay 35 is operated to open the contact between 36 and 37 and to cut off the electric current from an electric source 38 to the motor M to stop the rotation of the motor M.

As seen from the drawing, even if either one of the two swtiches 27 and G is closed, as long as the other switch is open, the relay 35 is not operated and the motor M will continue its rotation.

The control switch G described above is provided with a view to adapting the reading machine for the use of both a sheet of standard size and a sheet shorter than standard size.

The construction of the switch G will next be explained.

The switch comprises a contact element or member 39 (FIG. 15) provided on the pressing plate 30 and a contact element or member 40 (FIG. 14) provided on the panel plate 4. The contacting member 39 on the pressing plate 30 is a metallic leaf spring 41 fixed in a recess provided on the pressing plate and has contact points 42 at its ends as shown in FIG. 15. The contacting member 40 on the panel plate has two contact elements 43 which are inserted in a body of insulating material 44 set in the panel plate and are passed through the insulating body to be connected to conductive wires 45.

The contacting member 39 of the pressing plate 30 and the contacting member 40 of the panel plate are so constructed as to bring the contact points 42 and the contact elements 43 into contact when the pressing plate 30 is lowered on the panel plate 4 provided that there is nothing between them.

The positions of the contacting members are so selected that they will be outside of the bottom edge of a sheet of a shorter length which may be used on the reading machine but will be in the range of a sheet of a standard size.

When a sheet of a standard size is set on the panel plate and the pressing plate is lowered thereon, there is a record sheet of insulating material such as paper between the contacting member 39 of the pressing plate and the contacting member 40 of the panel plate. The switch G cannot be closed and consequently the motor M is not stopped even if the switch 27 is closed by the projection 26 of the shiftable plate 9. On the other hand, when a sheet of a shorter length is set on the panel plate and the pressing plate is lowered, the contacting member 39 of the pressing plate and the contacting member 40 of the panel plate are in contact and therefore the switch G is closed. Under this condition, if the projection 26 comes into contact with the lever 27′ of the switch 27, both switches 27 and G are closed to operate the relay 35 and the motor M is stopped.

Accordingly the danger which may arise in the operation of a record sheet of a length shorter than a standard size will be automatically prevented even if the edge of the sheet is in sagged condition as illustrated by dot-chain line in FIG. 8.

The improvement according to the present invention may be modified in various ways without departing from the spirit of the present invention. It is to be understood that the invention is not limited by the embodiment as illustrated but only by the following claims.

What is claimed is:

1. A magnetic sound transducing machine for use with magnetic record sheets of different sizes, said machine comprising a turntable, transducer heads peripherally spaced on said turntable, means for rotating said turntable while linearly displacing the same, a panel plate adjacent said turntable for supporting a sheet for scanning by said heads, and setting means operatively disposed on the panel plate to fix a sheet of one of said sizes on said panel plate, said machine further comprising a transparent plate hingedly connected to said panel plate for urging a sheet thereagainst, means for driving said turntable, and a control switch including elements on the panel plate and transparent plate and coupled to the latter said means for controlling the same and being rendered ineffective when a sheet is mounted on the panel plate and is of sufficient length to extend between said elements.

2. A magnetic sound transducing machine for use with magnetic record sheets of different sizes, said machine comprising a turntable, transducer heads peripherally spaced on said turntable, means for rotating said turntable while linearly displacing the same, a panel plate adjacent said turntable for supporting a sheet for scanning by said heads, and setting means operatively disposed on the panel plate to fix a sheet of one of said sizes on said panel plate, said panel plate being provided with marks indicating a proper setting for a sheet of different size, said machine further comprising a transparent plate hingedly connected to said panel plate for urging a sheet thereagainst, means for driving said turntable, and a control switch including elements on the panel plate and transparent plate and coupled to the latter said means for controlling the same and being rendered ineffective when a sheet is mounted on the panel plate and is of sufficient length to extend between said elements, said panel being provided with a window to expose a sheet mounted thereon, said machine further comprising clamps on the panel plate for engaging sheets shorter than said window.

References Cited in the file of this patent

UNITED STATES PATENTS 2,924,668 Hashino et al. ---------- Feb. 9, 1960